July 7, 1959   J. R. ANDERSON ET AL   2,893,107
BARIUM TITANATE AS A FERROELECTRIC MATERIAL Filed Aug. 7, 1952

○ A
○ B
○ OXYGEN

INVENTORS: J. R. ANDERSON
J. P. REMEIKA
BY
*N. A. Ewing*
ATTORNEY

United States Patent Office 2,893,107
Patented July 7, 1959

2,893,107
BARIUM TITANATE AS A FERROELECTRIC MATERIAL

John R. Anderson, Berkeley Heights, and Joseph P. Remeika, Newark, N.J., assignors to Bell Telephone Laboratories, Incorporated, New York, N.Y., a corporation of New York Application August 7, 1952, Serial No. 303,197

11 Claims. (Cl. 29—25.35)

This invention relates to crystalline dielectric materials, and more particularly to the preparation of ferroelectric crystalline materials.

Certain crystalline materials when exposed to an alternating polarizing voltage exhibit a relationship between the electrostatic polarizing force and the polarization in the direction of the applied force that is similar to the hysteresis loops exhibited by magnetic materials. Such materials, of which barium titanate is an outstanding example, are called "ferroelectrics," and they are generally characterized by high dielectric constants and high electromechanical coupling constants.

The practical applications of such materials are diverse, and they include, for example, electrical condensers, electromechanical transducers of various kinds, dielectric amplifiers and "memory circuits." In some applications one or more of the following properties also are significant: coercive force, remanent polarization, and form and symmetry of the hysteresis loop.

J. P. Remeika application Serial No. 303,196 filed on August 7, 1952, now abandoned, discloses a technique for growing macro single crystals consisting essentially of barium titanate having a hysteresis loop of improved form and symmetry, reduced dielectric loss, and generally improved ferroelectric characteristics. In a preferred example, the reactants, which consist essentially of stoichiometric proportions of barium carbonate and titanium dioxide with a small added quantity of ferric oxide, are dissolved in potassium fluoride flux, heated to a temperature within the range 1150° C. to 1225° C., inclusive, and slowly cooled to room temperature. A further technique disclosed by Remeika for improving the characteristics of ferroelectric materials comprises etching the crystal surfaces.

It is a general object of this invention to further improve certain characteristics of ferroelectric materials.

Another object of the invention is to improve the form and symmetry of the hysteresis loop of single crystals of barium titanate prepared in accordance with the technique of Remeika, and more specifically to lower the coercive force, and to increase the ratio of maximum to minimum slope on the hysteresis loop.

These and other objects are attained in accordance with the present invention by applying to a single crystal of barium titanate sinusoidal alternating voltage above a minimum frequency of about four kilocycles per second, while simultaneously gradually cooling the element from above the Curie temperature to room temperature.

In accordance with the present invention, the high frequency treatment described herein is applied to specimens which have been treated according to the technique devised by J. P. Remeika, to include small amounts of iron in the crystal structure and which, in certain cases, have been etched in acid.

Such a combination of treatments produces in each of the subject single crystals a more pronounced squaring of the hysteresis loop, and a more marked reduction in the coercive force than is evident with the added iron and etching treatments, without the applied high frequency treatment. For example, a lowering of the coercive force of the order of two to one is observed after etching of prior art barium titanate crystals, and of the order of ten to one after high frequency treatment of crystals which have been first treated with added iron, as taught by Remeika, whereas after high frequency treatment of crystals to which both preliminary techniques have been applied, a lowering of coercive force of the order of fourteen to one is observed in certain cases.

Other objects, features, and advantages of the invention will be better understood from a study of the following description and the attached drawings, in which Fig. 1 is a diagrammatic showing of the lattice structure of barium titanate;

Figure 4:
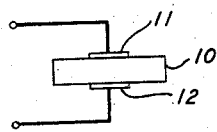
Figure 5:
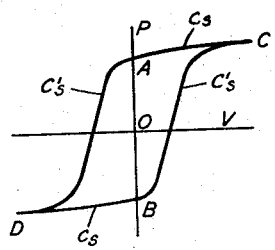
Figure 6:
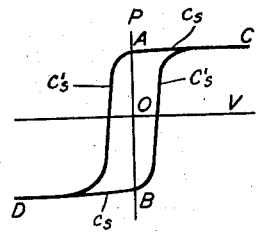

Fig. 4 shows a simple circuit element comprising a single crystal consisting essentially of barium titanate, including in the lattice structure thereof a small percentage of iron ions, to the major surfaces of which crystal are attached electrodes; and Figs. 5 and 6 respectively show hysteresis loops at 60 cycles per second for an unetched crystal consisting essentially of barium titanate containing 0.4 atomic percent of added iron, before and after high frequency treatment in accordance with the present invention.

Practice of the present invention is carried out using ferreoelectric single crystal specimens formed in accordance with the technique developed by J. P. Remeika.

Experiments performed by Remeika with a number of ferroelectric materials have led to the conclusion that when small amounts of iron oxide are included in the crystal melt, under certain conditions the Fe ion enters into the crystal lattice substitutionally to displace ions of comparable ionic radius in structures of the general formula $ABO_3$, with accompanying beneficial effects on the hysteresis characteristics of the crystals so formed.

Figure 1:
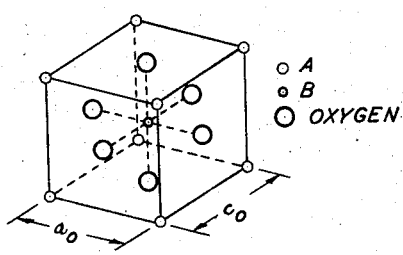

Fig. 1 shows a single lattice unit of the typical perovskite structure which characterizes barium titanate, in which the barium ions take the positions indicated by the intermediate-sized circles A at the corners of the pseudocube, the titanium ion takes a central position indicated by the smaller circle B, and the oxygen ions indicated by the larger circles O assume positions at the center of the faces of each of the pseudocubes. Below the Curie point, the dimensions of the horizontal rectangle of the unit cell indicated by $a_0$ and $c_0$ differ slightly from each other and the crystal is ferroelectric. Above the Curie point, the unit cell becomes a perfect cube, and the crystal ceases to be ferroelectric.

Preparation of barium titanate crystals in accordance with the technique of Remeika, in which the crystallization takes place in the form of large triangular plates, entails the use of anhydrous potassium fluoride as a solvent for commercial barium titanate and ferric oxide, which are heated in a platinum crucible to a temperature preferably within the range 1150° C. to 1225° C., inclusive, and cooled slowly to room temperature. The single crystal triangular plates so formed have area dimensions which are much greater than the thickness dimension. Typical charge and program are given below for producing triangular crystal plates of the form described consisting essentially of barium titanate in which a small proportion of iron ions are substituted for titanium ions in the crystal lattice structure.

|  | Grams |
|---|---|
| $BaTiO_3$ | 40.0 |
| $Fe_2O_3$ | [1] .0275 |
| Anhydrous KF | 100.0 |

[1] This is equivalent to 0.2 atomic percent.

The materials named are placed in a 100 cubic centimeter platinum crucible, which is covered with a platinum cover and placed in a temperature regulated furnace at a temperature of, for example, 1190° C. The temperature is maintained for ten hours. The composite is then cooled gradually, and the flux removed, for example, by dissolving it in distilled water.

Solubility data of a melt of the foregoing composition in the potassium fluoride flux is given as follows:

| Temperatures (degrees centigrade) | Grams dissolved in KF |
|---|---|
| 1150 | 22 |
| 1175 | 26 |
| 1200 | 30 |
| 1225 | 34 |

Crystals prepared in the manner described in the foregoing paragraph to include significant amounts of iron in integral formation with the lattice structure have been given the chemical designation $Ba(Ti,Fe)O_3$. As indicated hereinbefore, the foregoing formula designates a crystal lattice structure consisting of an essential component of barium titanate in which iron ions (atoms) replace the tetravalent titanium ions (atoms) in a small proportion of the lattice units in different specified percentages depending on the amounts of iron added to the melt from which the crystals are derived.

The hysteresis loops exhibited when ferroelectric materials such as barium titanate are subjected to variations in an applied electric field, are similar to the hysteresis loops exhibited by ferromagnetic materials. A hysteresis loop produced by application of a 60 cycle per second alternating voltage across a typical prior art crystal of $BaTiO_3$ is shown in Fig. 2 of the drawings, in which the electric field strength E applied through the thickness of the crystal is plotted against the consequent polarization P of the crystal.

Starting from zero field and polarization at point O, the curve rises to the right, at first gradually, then rapidly, and finally slopes asymptotically to saturation at C. Slow or rapid removal of the positive field now allows the polarization to fall to a positive value at A, the remanent polarization. To remove the latter, negative field must be applied; the magnitude of this field, the coercive force, depends on the pretreatment of the crystal. In analogy to the hysteresis loop of ferromagnetic materials, the remainder of the compelte loop CADBC is obtained.

The ferroelectric properties of barium titanate are found useful for a number of applications, including certain types of dielectric amplifiers and memory circuits, particularly of the types disclosed in J. R. Anderson applications Serial No. 254,245, filed November 1, 1951 and Serial No. 261,665, filed December 14, 1951, which issued as United States Patents Nos. 2,717,372 and 2,717,373, respectively, on September 6, 1955.

Figure 2:
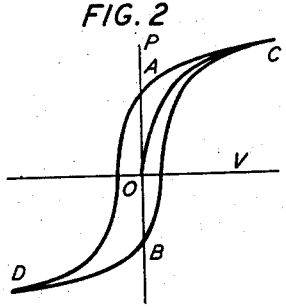
Fig. 2 shows a representative hysteresis loop at 60 cycles per second for barium titanate crystals grown by a prior art method.

For these applications certain improvements are desired in the shape of the hysteresis loop, over the form shown in Fig. 2, which is typical of prior art barium titanate.

Figure 3:
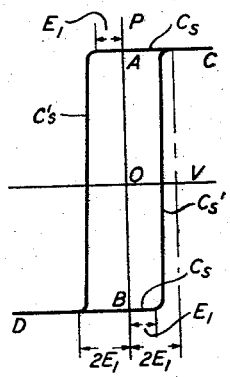
Fig. 3 shows an idealized ferroelectric hysteresis loop for certain types of applications.

Fig. 3 of the drawings shows an ideal hysteresis loop which might preferably characterize material suitable for memory circuits of the types disclosed by Anderson, cited, and for certain other applications. The fundamental requirement for such a material is that it be subject to saturation by voltage pulses $\pm 2E_1$ volts; but when the ferroelectric material is in either state A or B, as indicated on Fig. 3, the application of voltage pulses of $\pm E_1$ volts will not be sufficiently high to change its final state. The capacitance of a crystal or plate of the ideal material, which is represented by the slope of the hysteresis curve at any point, will thus always remain at a low value $C_s$ when positive or negative voltage pulses $E_1$ volts high are applied. However, when positive or negative voltage pulses $2E_1$ volts high are applied in a direction to reverse internal polarization, the state of the ferroelectric material will pass from a low capacitance region $C_s$ to a high capacitance region $C_s'$ and then on to a low capacitance region $C_s$ near saturation.

It has been shown that for optimum operation of such a system the ratio of $C_s'$ to $C_s$ should be as high as possible, preferably above 50 for use in certain types of memory cells. To keep the power requirements low for storing and reading out information in such a multiple element system, it is desirable that the value of the coercive force, be as low as possible, say 50 to 10 volts, without requiring that the thickness of the material be reduced too much. For the same reason, the effective capacity $C_s$ of the ferroelectric material should be as low as possible.

Crystals prepared in accordance with the present invention more nearly approximate the ideal characteristic described with reference to Fig. 3 than any of the ferroelectric materials prepared by prior art methods.

In accordance with one example of practice of the present invention, selected crystals consisting essentially of barium titanate, after pretreatment in the manner previously indicated, are exposed to high frequency voltages above four kilocycles per second while they are simultaneously lowered from a temperature above the Curie temperature gradually to room temperature. Although in the optimum case, the material to be treated is in the form of "single crystals," in which all of the domains are electrically aligned and the polar axes are in the direction of the applied field, the best crystals obtainable in practice have at least a few domains which are not so aligned.

As shown in Fig. 4 of the drawings electrodes 11 and 12 are so placed on the crystal 10 to be treated, that the field is applied in the direction of the polar or electric axis, which is normal to the plane of the major faces of the crystal. The electrodes, which may comprise, for example, thin metallic coatings evaporated on the respective surfaces, or air drying silver paint applied in a manner well known in the art. Electrodes of any type in which the application may disturb the condition of the surface of the subject crystals are to be avoided. The crystal is placed in a standard crystal holder and heated in an electric furnace to a temperature well above the Curie temperature. An electrical field, which is preferably a pure sine wave, free of harmonics, and which preferably has a frequency above four kilocycles per second is applied across the crystal, the strength of the applied field approximating the saturating field of the subject crystal at 60 cycles per second at room temperature. The field is maintained at a constant frequency and amplitude as the temperature is gradually lowered to about 10° C. above room temperature, at which point the amplitude of the applied field is slowly lowered to zero. This process can be carried on at frequencies within an optimum range of four to forty kilocycles. The period of treatment is determined by the cooling rate, which is preferably not greater than 100° C. per hour. However, the cooling may be carried on more rapidly if this can be achieved without fracturing the subject crystal. The minimum practical cooling time is about an hour. The effectiveness of the alternating voltage treatment is a function both of length of application and frequency, the higher the frequency the shorter the time of application required to produce the desired result. Frequencies above 50 kilocycles, while they may be effective in producing a desired result, are less practical than the lower ranges because of difficulty in providing suitable oscillating equipment, and the danger of overheating and cracking the treated crystals.

For practical example, a single crystal having a minimum thickness of 0.76 millimeter, which was derived from a melt consisting essentially of barium titanate containing 0.15 atomic percent of iron, was heated in its holder in an electric furnace to 155° C. at which temperature a six kilocycle field of 84 volt peak was applied thereacross. The furnace temperature was then lowered, while the six kilocycle field was maintained constant, to about ten degrees above room temperature, at which point the amplitude of the field was slowly lowered to zero, the entire treatment taking about one and a half hours.

Measurements made on the hysteresis loop of the abovedescribed crystal at 60 cycles per second, before and after high frequency treatment, showed a reduction in the coercive force from 6300 to 1100 volts per centimeter. When the treatment was repeated with the initial temperature raised to 214° C., is was found that the coercive force at 60 cycles per second was lowered to 590 volts per centimeter. Moreover, in the latter case, the hysteresis loop became more nearly rectangular with treatment.

Fig. 5 shows, prior to high frequency treatment, a hysteresis loop, as indicated on an oscilloscope, produced by application of a 60 cycle, alternating current of 112 volts peak to a crystal consisting essentially of barium titanate 0.017 centimeter thick, containing 0.4 atomic percent of added iron.

Fig. 6 shows the hysteresis loop for the same crystal as above, corresponding to an applied voltage of 60 cycles per second, 112 volts peak, after application of a six kilocycles per second field, 56 volts peak, for a period somewhat exceeding an hour during which the crystal element was heated to 270° C. and cooled again to room temperature.

In comparing the hysteresis loop shown in Fig. 6 with those observed in the same crystal consisting essentially of barium titanate before high frequency treatment, and with the typical prior art loop, it is seen that the crystal treated with high frequency field in the manner disclosed herein shows a marked reduction in coercive force and saturation field strength, and also an increase in the ratio of the capacitances $C_s$ and $C_s'$. The advantages of such a loop for the applications mentioned are apparent.

In some crystals, the hysteresis loops are found to be distorted and non-symmetric, even after treatment with an applied high frequency field. One cause for such distortion in the hysteresis loop is surface strains resulting from imperfection on the surface of the crystal. These can readily be removed and the symmetry and form of the hysteresis loop markedly improved by etching the subject crystal in acid as previously disclosed by J. P. Remeika, preferably prior to high frequency treatment. This has the effect of removing the imperfections present on the surface of the crystal, making the resultant crystal more nearly perfect, and reducing strains within the structure, whereby the alignment of the electrical domains takes place more uniformly in response to an applied field. Hence, the coercive force is lowered, and the loop is made more nearly rectangular.

It has been found that the optimum form of crystal element for memory cell and other applications utilizing an improved form of hysteresis loop is a single crystal specimen consisting essentially of barium titanate derived from a melt of commercial barium titanate to which between 0.1 and one atomic percent of iron was added, which has been etched for two minutes in hydrochloric acid, and high frequency treated in the manner described herein.

Comparative data on the characteristics of the hysteresis loop for untreated prior art crystals, and for crystals consisting essentially of barium titanate after etching with concentrated hydrochloric acid, and after high frequency treatment in accordance with the present invention, is given in the following table.

|  | Prior Art $BaTiO_3$ | $Ba(Ti, Fe)O_3$ (0.1–1 atomic percent added iron) | $Ba(Ti, Fe)O_3$ etched | $Ba(Ti, Fe)O_3$ etched, and high frequency treated |
|---|---|---|---|---|
| Coercive Force, Volts/cm | 7,000–14,000 | 2,000–5,000 | 2,000–4,000 | 500–1,000 |
| Saturation Field Strength, Volts/cm | 35,000–70,000 | 10,000–25,000 | 4,000–8,000 | 1,000–2,000 |
| Saturation Polarization × $10^{-6}$ coulombs/cm² | 14–16 | 14–16 | 14–16 | 14–16 |
| Remanent Polarization × $10^{-6}$ coulombs/cm² | 8–10 | 10–13 | 13–15 | 13–15 |
| Ratio, $C_s'/C_s$ | 5–15 | 20–50 | 50–80 | 80–130 |

Although the values for the high frequency treated crystals are about ten percent higher than shown in the table immediately after treatment, they decay to the values given after about six hours. The decay rate then drops off, so that the values remain substantially constant.

Applicants have further discovered that beneficial results may be obtained in lesser degree by applying the high frequency treatment to the crystals in the manner described hereinbefore, without externally heating the crystals. The temperature of the treated crystals will be above room temperature (but not above the Curie point) due to the internal heat generated under the influence of the alternating field. Such treatment has been found to lower the coercive force by about a factor of two.

What is claimed is:

1. The method of reducing the coercive force and squaring the hysteresis loop in a single crystal of ferroelectric material which comprises applying across said crystal alternating voltages having a frequency between four and fifty kilocycles per second, and simultaneously varying the temperature of the said crystal from a temperature above the Curie temperature to room temperature.

2. The method of treating a single crystal consisting essentially of barium titanate which comprises applying across said crystal sinusoidal alternating voltage having substantially constant frequency within the range four to forty kilocycles per second, and simultaneously varying the temperature of said crystal from a temperature above the Curie temperature down to room temperature.

3. The method of treating a single crystal consisting essentially of barium titanate which comprises applying across said crystal high frequency voltages having a frequency within the range four to forty kilocycles per second.

4. The method of treating a single crystal consisting essentially of barium titanate in accordance with claim 3 to enhance the ferroelectric properties of said crystal, in which said crystal is lowered from a temperature above the Curie temperature to room temperature during application of said high frequency fields.

5. The method of treating a single crystal consisting essentially of barium titanate in accordance with claim 4 to enhance the ferroelectric properties of said crystal, in which the rate of lowering the temperature of said crystal does not exceed about 100 degrees per hour.

6. The method of improving the hysteresis characteristic in a single crystal consisting essentially of barium titanate which comprises applying across said crystal high frequency voltage having a field strength which approximates the saturation field strength for said crystal at 60 cycles per second at room temperature, said voltage having a frequency in excess of four kilocycles per second.

7. The method in accordance with claim 6 of improving the hysteresis characteristic in a single crystal consisting essentially of barium titanate in which said crystal is lowered from a temperature above the Curie temperature to room temperature during application of said high frequency fields.

8. The method of improving the hysteresis characteristic of a single crystal of ferroelectric material having a perovskite structure which comprises applying across said crystal high frequency sinusoidal voltage having a field strength which approximates the saturation field strength for said crystal at 60 cycles per second at room temperature, said sinusoidal voltage having a frequency in excess of four kilocycles per second.

9. The method of treating a ferroelectric device to improve its hysteresis characteristics wherein said device is made up of a monocrystalline body consisting essentially of barium titanate in which iron ions have replaced titanium ions in between 0.1 and 2.4 percent of the crystal lattice units, and a pair of electrodes spaced apart in the direction of the polar axis of said monocrystalline body, which method comprises heating said device to a temperature above the Curie temperature of said monocrystalline body, applying to said electrodes a sinusoidal alternating voltage having a frequency within the range four to forty kilocycles per second and a peak voltage which essentially approximates the saturation voltage of said device at room temperature, and concurrently with the application of said alternating voltage gradually cooling said device.

10. The method of treating a barium titanate crystal for use as a ferroelectric element which comprises the steps of applying heat to said crystal to raise the temperature of said crystal substantially above room temperature, applying an alternating electrical field to said crystal at a frequency of between four kilocycles per second and forty kilocycles per second and of a magnitude which approximates the saturation field of said crystal and, while maintaining said alternating field, cooling said crystal at a rate of about 100 degrees centigrade per hour to a temperature of about ten degrees centigrade above room temperature.

11. The method of treating a barium titanate crystal for use as a ferroelectric element which comprises the steps of applying heat to said crystal to raise the temperature of the crystal to about 214 degrees centigrade, applying an alternating electric field to said crystal at a frequency of between four kilocycles per second and forty kilocycles per second and of a magnitude which approximates the saturation field of said crystal and, while maintaining said alternating field, cooling said crystal at a rate of about 100 degrees centigrade per hour to a temperature about ten degrees centigrade above room temperature and, at said last named temperature, gradually reducing said alternating field to zero.

References Cited in the file of this patent

UNITED STATES PATENTS

| | | |
|---|---|---|
| 2,268,823 | Herzog | Jan. 6, 1942 |
| 2,384,541 | Fruth | Sept. 11, 1945 |
| 2,420,864 | Chilowsky | May 20, 1947 |
| 2,486,560 | Gray | Nov. 1, 1949 |

FOREIGN PATENTS

| | | |
|---|---|---|
| 643,448 | Great Britain | Sept. 20, 1950 |